US009679674B2

(12) United States Patent
Ramón Raygoza et al.

(10) Patent No.: US 9,679,674 B2
(45) Date of Patent: Jun. 13, 2017

(54) DIELECTRIC MINERAL OIL CONDITIONED WITH GRAPHENE NANOFLAKES

(71) Applicants: PROLEC-GE INTERNACIONAL, S. DE R. L. DE C. V., Apodaca, Nuevo Leon (MX); INSTITUTO TECNOLOGICO Y DE ESTUDIOS SUPERIORES DE MONTERREY, Monterrey, Nuevo Leon (MX)

(72) Inventors: Edgar David Ramón Raygoza, Veracruz (MX); Carlos Iván Rivera Solorio, Guadalupe (MX); Enrique Giménez Torres, Valencia (ES)

(73) Assignees: PROLEC-GE INTERNACIONAL, S. DE R. L. DE C. V., Apodaca (MX); INSTITUTO TECHNOLÓGICO Y DE ESTUDIOS SUPERIORES DE MONTERREY, Monterrey (MX)

(*) Notice: Subject to any disclaimer, the term of this patent is extended or adjusted under 35 U.S.C. 154(b) by 0 days.

(21) Appl. No.: 14/438,104

(22) PCT Filed: Oct. 24, 2013

(86) PCT No.: PCT/MX2013/000129
§ 371 (c)(1),
(2) Date: Apr. 23, 2015

(87) PCT Pub. No.: WO2014/065647
PCT Pub. Date: May 1, 2014

(65) Prior Publication Data
US 2015/0294753 A1    Oct. 15, 2015

(30) Foreign Application Priority Data
Oct. 24, 2012    (MX) .................... MX/a/2012/012392

(51) Int. Cl.
| | |
|---|---|
| *H01B 3/22* | (2006.01) |
| *B82Y 30/00* | (2011.01) |
| *C09K 5/10* | (2006.01) |
| *C01B 31/04* | (2006.01) |
| *B82Y 40/00* | (2011.01) |
| *C10M 171/06* | (2006.01) |
| *H01B 3/20* | (2006.01) |

(52) U.S. Cl.
CPC ................ *H01B 3/22* (2013.01); *B82Y 30/00* (2013.01); *B82Y 40/00* (2013.01); *C01B 31/0469* (2013.01); *C09K 5/10* (2013.01); *C10M 171/06* (2013.01); *H01B 3/20* (2013.01); *C10M 2201/041* (2013.01); *C10M 2201/05* (2013.01); *C10M 2203/1006* (2013.01); *C10N 2220/082* (2013.01); *C10N 2230/08* (2013.01); *C10N 2230/10* (2013.01); *C10N 2240/201* (2013.01)

(58) Field of Classification Search
CPC .................................. C09K 5/10; H01B 3/22
USPC ......................................................... 252/572
See application file for complete search history.

(56) References Cited

U.S. PATENT DOCUMENTS

| | | | |
|---|---|---|---|
| 4,082,866 A | 4/1978 | Link | |
| 4,206,066 A | 6/1980 | Rinehart | |
| 4,621,302 A | 11/1986 | Sato et al. | |
| 5,017,733 A | 5/1991 | Sato et al. | |
| 5,250,750 A | 10/1993 | Shubkin et al. | |
| 5,336,847 A | 8/1994 | Nakagami | |
| 2003/0151030 A1* | 8/2003 | Gurin | B82Y 10/00 252/502 |
| 2007/0158609 A1* | 7/2007 | Hong | B82Y 30/00 252/71 |
| 2009/0033164 A1* | 2/2009 | Khan | C10M 169/04 310/90 |
| 2009/0036605 A1* | 2/2009 | Ver Meer | E21B 33/1208 525/55 |
| 2011/0046027 A1 | 2/2011 | Zhamu et al. | |
| 2015/0294753 A1* | 10/2015 | Ram Raygoza | B82Y 30/00 252/572 |

FOREIGN PATENT DOCUMENTS

CN    101950601    1/2011

OTHER PUBLICATIONS

U.S. Appl. No. 14/438,104. NPL, Baby et al. 2011.*
Georgakilas et al. Graphene nanoflakes.*
Baby, et al., "Synthesis and nanofluid application of silver nanoparticles decorated graphene", J. Mater. Chem., vol. 21, 2011, pp. 9702-9709.
Li et al., "Experimental investigation of thermal conductivity and viscosity of ethylene glycol based ZnO nanofluids", Applied Thermal Engineering 2015; 1-6.
Mehrali et al., "Heat transfer and entropy generation for laminar forced convection flow of graphene nanoplatelets nanofluids in a horizontal tube", International Communications in Heat and Mass Transfer 2015; 66:23-31.
Sadeghinezhad et al., "An experimental and numerical investigation of heat transfer enhancement for graphene nanoplatelets nanofluids in turbulent flow conditions", International Journal of Heat and Mass Transfer 2015; 81:41-51.
Yarmand, et al. "Graphene nanoplatelets—silver hybrid nanofluids for enhanced heat transfer", Energy Conversion and Management 2015; 100: 419-428.
Xing, et al., "Experimental study on the thermal conductivity enhancement of water based nanofluids using different types of carbon nanotubes", International Journal of Heat and Mass Transfer 2015; 88:609-616.

(Continued)

*Primary Examiner* — Nicole M Buie-Hatcher
*Assistant Examiner* — M. Reza Asdjodi
(74) *Attorney, Agent, or Firm* — Hamre, Schumann, Mueller & Larson, P.C.

(57) ABSTRACT

The invention relates to a dielectric mineral oil composition for a transformer, formed by at least one dielectric mineral oil and graphene nanoflakes decorated with metal nanoparticles and/or ceramic nanoparticles. The dielectric mineral oil composition has improved thermal conductivity and stability.

12 Claims, 1 Drawing Sheet

(56) References Cited

OTHER PUBLICATIONS

Ghozatloo, et al., "Convective heat transfer enhancement of graphene nanofluids in shell and tube heat exchanger", Experimental Thermal and Fluid Science 2014; 53:136-141.
Zhang, et al., "Measurements of mechanical properties and number of layers of graphene from nano-indentation", Diamond and Related Materials 2012;24:1-5.
Rao, et al., "Graphene: the new two-dimensional nanomaterial", Angew.Chem.Int.Ed. 2009;48:7752-7777.
Kaniyoor, et al., "Graphene synthesis via hydrogen induced low temperature exfoliation of graphite oxide", J. Mater. Chem., 2010,20, 8467-8469.
Product Data Sheet, Standard Grade Nytro Taurus Electrical Insulating Oil, Apr. 1, 2012, 2 pages.
Safety Data Sheet, Mineral oil, Product No. M5904, Sigma-Aldrich Corporation, May 23, 2016, 7 pages.

\* cited by examiner

DIELECTRIC MINERAL OIL CONDITIONED WITH GRAPHENE NANOFLAKES

TECHNICAL FIELD OF THE INVENTION

The present invention generally refers to dielectric fluids for devices used in the transmission and distribution of electrical power. More specifically, the invention refers to a dielectric mineral oil composition comprising graphene nanoflakes decorated with nanoparticles, either metallic nanoparticles, ceramic nanoparticles and combinations thereof.

BACKGROUND OF THE INVENTION

Electrical devices such as transformers, reactors, capacitors, circuit breakers, among others, use dielectric fluids inside them, also called dielectric oils, which are used as a medium for insulation and dissipation of heat generated by the internal components of the device.

The dielectric fluid must be able to effectively and reliably perform its functions as a cooling and isolation medium during the service life of the electrical device.

Obviously, many of the properties of the dielectric fluid should be considered as necessary to provide the expected dielectric and cooling capacities, according to its application, so that depending thereon, their ability to function effectively and reliably can be affected. These properties may include: dielectric strength, dielectric constant, dissipation factor, viscosity, acid number, pour temperature, and ignition temperature.

The dielectric strength of the fluid indicates its ability to resist electrical breakdown at certain power frequencies and is measured as the minimum electrical voltage required to cause arcing between two electrodes immersed in the dielectric fluid.

The dielectric constant is the ratio of the capacitance of a capacitor containing a dielectric (oil) between its plates, between the capacitance of the same capacitor when the dielectric is a vacuum. This property is related to the ability of the dielectric fluid to conduct electricity, so that the lower the value thereof the higher capacity shall the dielectric fluid have.

The dissipation factor of a dielectric fluid is the measure of the dielectric losses in that fluid, generally as heat. A low dissipation factor indicates low dielectric losses and a low concentration of polar contaminants soluble in the dielectric fluid.

The acid number in a dielectric fluid is a measure of the constituents or acid pollutants of the fluid. The acidity of a dielectric fluid is due to the formation of acid oxidation products. Acids and other oxidation products, along with water and solid contaminants, will affect the dielectric properties and others of the dielectric fluid. The increase rate of the dielectric fluid acid number is a good indicator of the aging rate thereof.

Pour temperature is the temperature at which a fluid stops flowing, taking the solid state at ambient pressure. The pour temperature may also be defined as the maximum temperature (usually below zero ° C.) at which the dielectric fluid can not move or deform under its own weight. The lower this temperature, the dielectric fluid shall be applied in electrical devices subject to extreme temperatures below zero ° C.

The ignition temperature, also known as flash point, is the temperature that the dielectric fluid should reach for resulting in the ignition of the vapors thereof, when exposed to air and the source of ignition.

Since dielectric fluids cool by convection the electric devices to which they are applied, the viscosity of these fluids at various temperatures is another important factor to consider. Viscosity is a measure of the resistance of a fluid to flow and is typically analyzed in terms of kinematic viscosity. At lower viscosities, the dielectric fluid circulates or flows better inside the electrical device and thus allows better heat dissipation.

Among the dielectric fluids used in electrical devices and that have these and other properties, those dielectric fluids based on mineral oils, silicones, synthetic oils, vegetable oils with antioxidants or mixtures thereof are included.

Dielectric fluids based on mineral oils derived from petroleum, silicone based oils or synthetic oils have been widely used in electrical transformers, power cables and capacitors. Examples of these oils are found in U.S. Pat. Nos. 4,082,866, 4,206,066, 4,621,302, 5,017,733, 5,250,750 and 5,336,847.

It has been shown that the incorporation of nanoparticles to dielectric fluids or lubricants based on mineral oil improves the tribological properties thereof, as described by the following patent documents.

Aruna Zhamu et al., in published US patent application US-2011/0046027 A1, discloses a lubricant composition based on mineral oil or synthetic oil including graphene nanoflakes in a dispersed form and in an amount of 0.001% to 60% by weight. These are preferably single layer graphene nanoflakes, and depending on their amount, the lubricant tends to be a fat. Mineral oil or synthetic oil modified with these graphene nanoflakes has a better thermal conductivity, a better friction coefficient, improved anti-wear performance and better viscosity stability compared to mineral oils or synthetic oils modified only with graphene nanoparticles or carbon nanotubes.

Jian Li et al. from University of Chongqing in Chinese patent application publication CN101950601, disclose a dielectric mineral oil used in power transformers, including nanoparticles which are dispersed in the mineral oil by ultrasound. The incorporation of nanoparticles in the dielectric mineral oil improves the dielectric strength thereof as compared to dielectric mineral oils without nanoparticles added.

However, in both techniques indicated above the synergistic use of the benefits of incorporating in a dielectric mineral oil a combination of graphene nanoflakes and nanoparticles is not described. Therefore, the present invention provides a dielectric mineral oil having excellent thermal conductivity and stability resulting from the synergistic incorporation of graphene nanoflakes and nanoparticles, whether metal nanoparticles, ceramic nanoparticles and combinations thereof.

BRIEF DESCRIPTION OF THE FIGURES

The characteristic details of the invention are described in the following paragraphs along with the accompanying figures, whose purpose is to define the invention but without limiting the scope thereof.

DETAILED DISCLOSURE OF THE INVENTION

Figure 1:
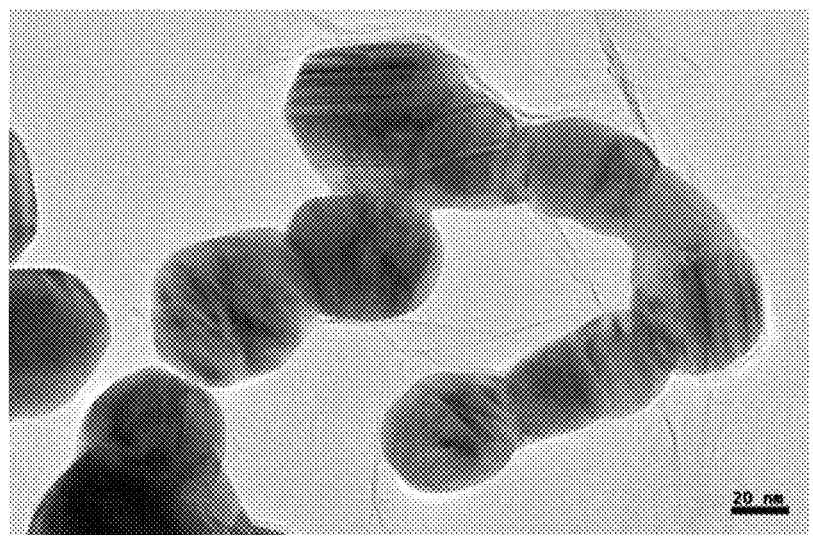
FIG. 1 shows a SEM image of graphene nanoflakes decorated with silver nanoparticles useful for the present invention.

The characteristic details of the invention are described in the following paragraphs, whose purpose is to define the invention but without limiting the scope thereof.

The dielectric mineral oil composition of the present invention is a novel alternative of dielectric fluid for applications in the electrical industry, so the compounds that make it up are described individually below, without necessarily being described in order of importance.

Dielectric Mineral Oil

The dielectric mineral oil composition of the present invention may use one or more dielectric mineral oils.

Dielectric mineral oils of the present invention are petroleum derivatives, are basically made up of carbon and hydrogen, being considered paraffinic those of straight or branched chain such as n-alkanes. Due to their chemical structure, these compounds are less stable than the naphthenic and aromatic ones. The naphthenic molecules also known as cycloalkanes, define the quality of the oil, are formed by cyclic structures of 5, 6 or 7 carbons and their dielectric properties are better by having greater solubility than the n-alkanes; to a greater extent all transformer mineral oils contain aromatic molecules which contain at least one ring of six carbon atoms joined by double bonds, known as benzene. Aromatic hydrocarbons also differ from others not only in their chemical structure, they also have large differences in their physical and chemical properties with naphthenic and paraffinic molecules. The variety of hydrocarbons in dielectric mineral oils depends on the refining process of oil, whose chemical composition depends on its origin.

It is considered that the form of distillation and additives applied is what provides the quality to the dielectric mineral oil, so the analysis thereof is what shall indicate whether it is suitable for the electrical equipment concerned or not. The raw material for the manufacture of dielectric mineral oil includes paraffinic, naphthenic and aromatic hydrocarbons, and sulfur, nitrogen and oxygen compounds that are called polar are also present in very low concentrations, which give oxidative instability to the dielectric mineral oil, so also the dielectric mineral oils include antioxidants.

Existing processes for producing dielectric mineral oils have been developed to remove unwanted compounds from raw materials and retain those desirable therein.

When removing unwanted compounds by extraction with suitable compounds, among the compounds most commonly used are sulfuric acid and furfural, this being the most selective solvent. Aromatic compounds are also removed, but this can be controlled by the oil-furfural ratio. Accordingly, dielectric mineral oils with different contents of the above mentioned components can be obtained.

An example of dielectric mineral oil useful for the invention is the transformer dielectric mineral oil commercially named NYTRO LYRA X® from NYNAS® company whose specifications are shown in Table 1.

TABLE 1

| Properties | Units | Assay Method | Value |
|---|---|---|---|
| Physical | | | |
| Appearance | | IEC60296 | Transparent, free from sediment |
| Density at 20° C. | kg/dm³ | ISO12185 | 0.895 |
| Viscosity at 40° C. | mm²/s | ISO3104 | 12 |
| Viscosity at −30° C. | mm²/s | ISO3104 | 1800 |
| Pour point | ° C. | ISO3016 | −40 |
| Chemical | | | |
| Acidity | mg KOH/g | IEC62021 | 0.01 |
| Sulphur Content | % | ISO14595 | 0.15 |

TABLE 1-continued

| Properties | Units | Assay Method | Value |
|---|---|---|---|
| Antioxidants, phenols | % by weight | IEC60666 | 0.08 |
| Water content | mg/kg | IEC60814 | 30 |
| Electrical | | | |
| Dielectric loss factor (DDF) at 90° C. | 90° C. | IEC60247 | 0.005 |
| Interfacial voltage | mN/m | ISO6295 | 40 |
| Oxidative Stability | | | |
| 120° C., 500 h | | IEC6125C | |
| Total acidity | mg KOH/g | | 0.3 |
| Muds | % by weight | | 0.005 |
| Flash point (PM) | ° C. | ISO2719 | 135 |

Graphene Nanoflakes Decorated with Nanoparticles

The dielectric mineral oil composition of the present invention may use one or more graphene nanoflakes decorated with metal nanoparticles or ceramic.

The graphene nanoflakes herein come from exfoliation of the carbon bidimensional atomic layers forming the graphite oxide and can be obtained following the Staudenmaier method, which consists of an initial graphite oxidation step using sulfuric and nitric acid, as well as potassium chlorate as the catalyst. This is followed by a reaction time of about 96 hours, after which the mixture is washed and filtered to obtain graphite oxide. Finally, once graphite oxide is dried and powdered, an exothermic reaction at 1020° C. is carried out for obtaining the graphene nanoflakes.

The graphene nanoflakes obtained have an average thickness less than 10 nm and have a width and length lower than 500 nm, and in turn can consist of more than one graphene layer.

Subsequently, these graphene nanoflakes can be decorated with metal nanoparticles or ceramic nanoparticles. Among metal nanoparticles useful for the present invention are, for example, nanoparticles of silver, copper, gold, zinc, aluminum, titanium, chromium, iron, cobalt, tin and chromium, and combinations thereof. Among the ceramic nanoparticles useful for the present invention, are for example nanoparticles of titanium oxide, copper oxide, aluminum oxide, aluminum nitride, zinc oxide, silicon oxide and combinations thereof.

Examples of obtaining graphene nanoflakes decorated with nanoparticles are described below:

Production of Graphene Nanoflakes Decorated with Silver Nanoparticles

The graphene nanoflakes decorated with silver nanoparticles can be obtained from the mixture of graphite oxide and silver nitrate in appropriate ratios, said mixture being dissolved in distilled water. Subsequently, a low-energy ultrasonic mixing is carried out and sodium borohydride is added to allow the reduction of silver. The mixture is allowed to react for one day with magnetic stirring at high speeds and temperatures above 80° C. Finally, it passes to an exothermic reaction phase in a controlled atmosphere furnace at 1020° C. to obtain graphene flakes decorated with silver nanoparticles. FIG. 1 shows a SEM image of graphene nanoflakes decorated with silver nanoparticles.

Production of Graphene Nanoflakes Decorated with Copper Nanoparticles

Figure 2:
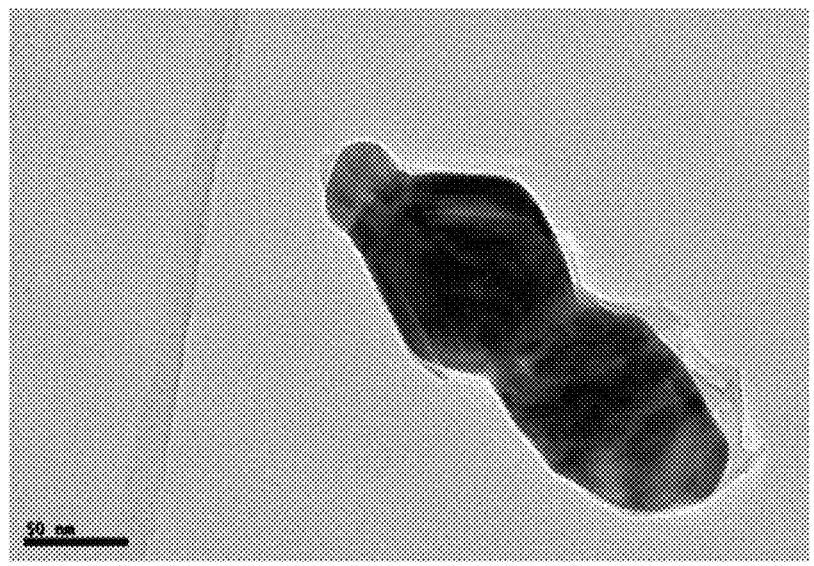
FIG. 2 shows a SEM image of graphene nanoflakes decorated with copper nanoparticles useful for the present invention.

The graphene nanoflakes decorated with copper nanoparticles can be obtained by mixing graphite oxide and copper tetraamine in suitable ratios, said mixture being dissolved in ammonia changed to acidic pH. It then follows a low energy stirring to complete the chemical reduction of copper. Finally an exothermic reaction takes place in a controlled atmosphere at 1020° C. to obtain graphene flakes decorated with copper nanoparticles. FIG. 2 shows a SEM image of graphene nanoflakes decorated with copper nanoparticles.

The content of graphene nanoflakes decorated with metal or ceramic nanoparticles is about 0.01% to about 20% by weight of graphene decorated nanoflakes based on the total weight of mineral oil and combined decorated graphene nanoflakes. The graphene nanoflakes are decorated with metal or ceramic nanoparticles in a ratio of at least about 1:5.

Method of Preparation, Mixing, Process and Composition of the Invention

The process of preparing the composition of dielectric mineral oil modified with decorated graphene nanoflakes consists primarily of mixing graphene nanoflakes decorated with metal or ceramic nanoparticles in the base dielectric mineral oil by a magnetic grill for about 10-15 minutes. Subsequently oleic acid is added as surfactant in a concentration of about 3% by weight to volume and is stirred in ultrasonic bath for about 15 minutes. Finally, the mixture is ultrasonically sonicated for an hour in the Hielscher UP400S model (400 watts, 24 kHz). This last step is done in 0° C. water bath.

A final composition of the mineral dielectric oil modified with graphene nanoflakes decorated with metal and/or ceramic nanoparticles dispersed in said dielectric mineral oil has from about 0.01% to about 20 wt % graphene nanoflakes decorated with metal and/or ceramic nanoparticles, and about 80% by weight to about 99.99% by weight of dielectric mineral oil.

Exemplary Embodiments of the Invention

The invention will now be described with respect to the following examples, which are solely for the purpose of representing the way of carrying out the implementation of the principles of the invention. The following examples are not intended as a comprehensive representation of the invention, nor are intended to limit the scope thereof.

Six examples of comparative experiments were conducted. Examples 1, 2, 3 and 4 provide compositions according to the prior art, whereas Examples 5 and 6 represent experiments according to the present invention.

In Examples 1, 2, 3, and 4 the effects of using nanoparticles of aluminum oxide, copper oxide, silver and graphene nanoflakes, respectively, dispersed in NYTRO LYRA X® dielectric mineral oil of NYNAS® Company were assessed. The assessed concentration is 5 wt % of the nanoflakes or nanoparticles listed above. Furthermore, in Examples 5 and 6 the effects of using graphene nanoflakes decorated with silver and copper nanoparticles, respectively, at a concentration of 3 wt % dispersed in NYTRO LYRA X® dielectric mineral oil of NYNAS® Company were assessed.

After preparing each of the samples of each example we proceeded to their thermal characterization as follows:

Thermal Conductivity

The measurement of the thermal conductivity was performed using the transient plane source (TPS) technique. According to the TPS method, the thermal conductivity of the liquid is determined by measuring the resistance of a probe immersed in the liquid. The equipment used for these measurements was the C-Therm TCI (http://www.ctherm.com), which is based on the TPS technique described above. All measurements were performed at room temperature (23° C.) and at least 10 measurement repeats were performed for each experiment. To calculate the increase in thermal conductivity, the thermal conductivity of the pure dielectric mineral oil was measured, and this value was taken as reference.

The results of thermal conductivity are shown in Table 2.

TABLE 2

| Example | Nanoparticle or nanoflake concentration in % wt | K (K/mk) | T (° C.) | (K − $K_0$)/$K_0$ | Improvement (%) |
|---|---|---|---|---|---|
| Pure (unmodified) dielectric mineral oil | 0 | 0.150 | 25 | | |
| Example 1 (dielectric mineral oil + aluminum oxide nanoparticles) | 5 | 0.179 | 25 | 0.19 | 19.33 |
| Example 2 (dielectric mineral oil + copper oxide nanoparticles) | 5 | 0.253 | 25 | 0.69 | 68.67 |
| Example 1 (dielectric mineral oil + silver nanoparticles) | 5 | 0.216 | 25 | 0.44 | 44.00 |
| Example 4 (dielectric mineral oil + graphene nanoflakes) | 3 | 0.164 | 25 | 0.10 | 9.53 |
| Example 5 (dielectric mineral oil + graphene nanoflakes decorated with silver nanoparticles) | 3 | 0.179 | 25 | 0.19 | 19.33 |
| Example 6 (dielectric mineral oil + graphene nanoflakes decorated with copper nanoparticles) | 3 | 0.203 | 25 | 0.35 | 35.33 |

Stability Test

Stability tests were carried out using the display method, for which 15 ml of each sample were poured into test tubes and kept stationary in a rack to observe sedimentation over time.

In the case of Examples 1, 2 and 3 it was observed that sedimentation began to occur after one hour of production. Total sedimentation was observed after 3 days.

For Examples 4, 5, and 6 no sedimentation was observed after 5 months of production. Therefore, it is suggested that graphene flakes showed stability in transformer mineral oil.

The best stability performance is due to:
  Stability is due mainly to the high aspect ratio of graphene (length/thickness ratio). Each graphene nanoflake has a thickness of 1 nm, so the graphene nanoflakes have a wide surface area that can better interact with the fluid.
  The structure of graphene based on carbon atoms forms hexagonal cells. Organic nature similar to that of dielectric mineral oil which promotes greater stability against other nanofillers (metal particles or inorganic fillers).
  Surface oxidation and/or modification that enhances stability in the dielectric mineral oil through the increased chemical affinity (more hydrophilic surface) by anchoring surface carboxyl groups (by covalent chemical bonds) that favor the interaction with the base fluid.

The compositions of dielectric mineral oil modified with graphene nanoflakes decorated with metal or ceramic nanoparticles were those that gave the best results in the two variables of interest (thermal conductivity and stability). While (undecorated) graphene nanoflakes by themselves exhibited complete stability in the dielectric mineral oil, they showed the smallest increase in thermal conductivity compared with other nanoparticles. Furthermore, the copper and silver oxide nanoparticles showed the greatest increases in thermal conductivities, however, their stability is minimal compared to the use of the decorated graphene nanoflakes. Finally, graphene flakes decorated with both silver and copper nanoparticles showed very positive synergy, retained the benefits of stability of graphene nanoflakes by themselves and also greatly increased the thermal conductivity.

Based on the embodiments described above, it is contemplated that modifications to these embodiments and other alternative embodiments will be considered obvious to a person skilled in the art under the present specification. It is therefore considered that the claims cover those modifications and alternatives that are within the scope of the present invention or its equivalents.

The invention claimed is:

1. A dielectric mineral oil composition comprising:
graphene nanoflakes dispersed in a dielectric mineral oil,
the graphene nanoflakes are decorated with nanoparticles selected from a group consisting of metal nanoparticles, ceramic nanoparticles and combinations thereof,
the graphene nanoflakes decorated with nanoparticles comprise 0.01% to 20% by weight of a total weight of the dielectric mineral oil composition.

2. The dielectric mineral oil composition according to claim 1, wherein the graphene nanoflakes have an average thickness less than 10 nm.

3. The dielectric mineral oil composition according to claim 1, wherein the graphene nanoflakes have more than one graphene layer.

4. The dielectric mineral oil composition according to claim 1, wherein the graphene nanoflakes have a width and a length less than 500 nm.

5. The dielectric mineral oil composition according to claim 1, wherein the graphene nanoflakes come from exfoliation of the carbon bidimensional atomic layers that form graphite oxide.

6. The dielectric mineral oil composition according to claim 1, wherein the graphene nanoflakes are decorated with ceramic or metallic nanoparticles in a ratio of at least 1:5.

7. The dielectric mineral oil composition according to claim 1, wherein the nanoparticles are the metal nanoparticles, and the metal nanoparticles are selected from a group consisting of silver, copper, gold, zinc, aluminum, titanium, chromium, iron, cobalt, tin and chromium nanoparticles, and combinations thereof.

8. The dielectric mineral oil composition according to claim 1, wherein the nanoparticles are the ceramic nanoparticles, and the ceramic nanoparticles are selected from a group consisting of titanium oxide, copper oxide, aluminum oxide, aluminum nitride, zinc oxide, silicon oxide nanoparticles, and combinations thereof.

9. The dielectric mineral oil composition according to claim 1, further comprising a surfactant selected from a group consisting of oleic acid, pyrrole, polypyrrole, polyvinylpyrrolidone, ammonium polymethacrylate and combinations thereof.

10. The dielectric mineral oil composition according to claim 1, wherein each graphene nanoflake has a thickness of 1 nm and increases stability of the dielectric mineral oil composition.

11. The dielectric mineral oil composition according to claim 1, wherein the graphene nanoflakes decorated with nanoparticles increases a chemical affinity of the dielectric mineral oil such that the dielectric mineral oil anchors surface carboxyl groups via covalent bonds, thereby increasing a stability of the dielectric mineral oil composition.

12. The dielectric mineral oil composition according to claim 1, wherein the dielectric mineral oil composition has a stability where no sedimentation occurs after five months.

* * * * *